United States Patent [19]

Takahashi

[11] Patent Number: 4,977,534

[45] Date of Patent: Dec. 11, 1990

[54] OPERATION CIRCUIT BASED ON FLOATING-POINT REPRESENTATION WITH SELECTIVE BYPASS FOR INCREASING PROCESSING SPEED

[75] Inventor: Hiromasa Takahashi, Ebina, Japan

[73] Assignee: Fujitsu Limited, Kawasaki, Japan

[21] Appl. No.: 320,496

[22] Filed: Mar. 8, 1989

[30] Foreign Application Priority Data

Mar. 11, 1988 [JP] Japan .................................. 63-58826

[51] Int. Cl.$^5$ .............................................. G06F 7/38
[52] U.S. Cl. ................................................... 364/748
[58] Field of Search ........................... 364/748, 715.08; 377/64, 67, 77, 81

[56] References Cited

U.S. PATENT DOCUMENTS

| | | | |
|---|---|---|---|
| 4,075,704 | 2/1978 | O'Leary | 364/748 |
| 4,644,490 | 2/1987 | Kobayashi et al. | 364/748 |
| 4,796,218 | 1/1989 | Tanaka et al. | 364/748 |
| 4,827,441 | 5/1989 | Someshwar et al. | 377/64 |
| 4,841,467 | 6/1989 | Ho et al. | 364/748 |
| 4,866,652 | 9/1989 | Chu et al. | 364/748 |

FOREIGN PATENT DOCUMENTS 0145465  6/1985  European Pat. Off. ............ 364/748

Primary Examiner—Dale M. Shaw
Attorney, Agent, or Firm—Staas & Halsey

[57] ABSTRACT

An operation circuit based on a floating-point representation system includes a first bypass line with respect to a shifter, and a second bypass line with respect to a two's complementer. When values of the exponent parts of two input operands are identical to each other, the mantissa part of one of the input operands bypasses the shifter, and is supplied to an ALU. In the other case, the mantissa of one of the input operands passes through the shifter, and is always supplied to the ALU. The mantissa of the other input operand is directly supplied to the ALU. When the values of the exponent parts are identical to each other, an output of the ALU passes through the two's complementer and is output as a final operation result. In other cases, the output of the ALU is directly supplied as the final operation result. The sign of the final operation result is determined by a sign discriminator.

9 Claims, 4 Drawing Sheets

OPERATION CIRCUIT BASED ON FLOATING-POINT REPRESENTATION WITH SELECTIVE BYPASS FOR INCREASING PROCESSING SPEED

BACKGROUND OF THE INVENTION

The present invention generally relates to an operation circuit based on a floating-point representation.

Generally, the fixed-point representation system is not, capable of representing an extremely large number, because of the narrow span of numbers which can be represented by the fixed-point representation system. Additionally, in most cases, the fixed-point representation system handles only an integer. For these reasons, it is required to provide another representation system for representing real numbers, as is necessary for operation for use in science and technology. From this viewpoint, a floating-point representation system has been proposed, in which two numbers called an exponent and a mantissa are combined.

A general floating-point number is represented as follows:

$$-1)^s \cdot m \cdot R^e \quad (1)$$

where 'R' is the radix and 's' denotes the sign. When the sign is positive, s=0, and on the other hand, when the sign is negative, s=1. Further, 'm' and 'e' are the mantissa and the exponent, respectively. The floating-point representation system is constructed by combining the representation of formula (1) and the fixed-point representation. It is noted that the effective length of the digits depends on the length of the mantissa. For this reason, when it is desired to represent numbers with high precision, a representation system is employed such that an increased length of the mantissa part is used.

The floating-point operation can provide a wide dynamic range and high precision, compared with integer operation. Particularly, the recent trend exhibits the requirement of high-speed operation capable of satisfying requirements for a variety of high-level operations.

A conventional floating-point operation circuit for processing two input operands includes selectors, an exponent part comparator, a shifter, an arithmetic and logic unit (hereafter simply referred to as an ALU), and a complementer. The input operands pass through the exponent part comparator, the shifter, the ALU and the complementer without exception. However, it is noted that there are some cases where some operands are not required to be passed through all the parts. Particularly, an amount of delay occurring in the shifter and the complementer is about same as that for the ALU. From this viewpoint, there exists a delay in signal processing in the conventional floating-point operation circuit. Such a delay prevents high-speed floating-point operation.

SUMMARY OF THE INVENTION

It is therefore a general object of the present invention to provide an operation circuit based on the floating-point representation system in which the above-mentioned disadvantages are eliminated.

A more specific object of the present invention is to provide an operation circuit based on the floating-point representation system in which floating operation can be carried out with increased speed.

The above objects of the present invention can be achieved by an operation circuit for processing two input numbers, each represented by the floating-point representation system with a sign, an exponent part and a mantissa part, comprising comparing means for comparing values of the exponent parts of the two input numbers with each other and for determining the number of shifts required with respect to the mantissa part of one of the two input numbers and producing a comparison result indicating the relationship in magnitude between the values of the exponent parts of the two input numbers; selecting means for selectively outputting the mantissa parts of the two input numbers based on the comparison result supplied from the comparing means; shifter means including a shifter and a first bypass line, for shifting, by the number of shifts determined by the comparing means, the mantissa part having the smaller value, as supplied from the selecting means when the values of the exponent parts of the two input numbers are different from each other and for outputting one of the mantissa parts of the two input numbers through the first bypass line when the values of the exponent parts of the two input numbers are identical to each other; operation means for carrying out a predetermined operation between the mantissa part supplied from the shifter means and the other mantissa part supplied from the selecting means, and thereby producing an operation result; and complement calculating means including a two's complementer and a second bypass line, for outputting the operation result through the two's complementer when the values of both the exponent parts are identical to each other and for outputting the operation result through the second bypass line when the values of both the exponent parts are different from each other, thereby outputting the final operation result.

Other objects, features and advantages of the present invention will become apparent from the following detailed description when read in conjunction with the accompanying drawings.

DETAILED DESCRIPTION

A description is given of a conventional floating-point operation circuit in order to facilitate the understanding of the present invention.

Figure 1:
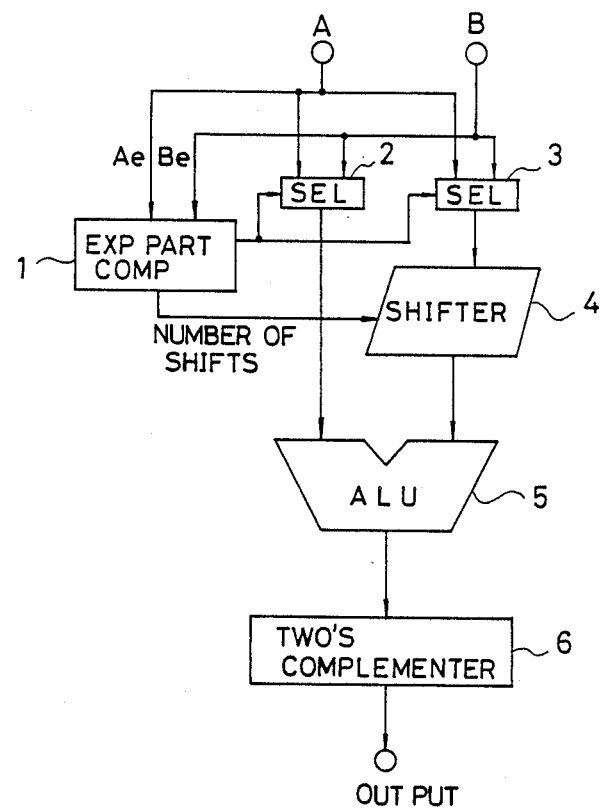
FIG. 1 is a block diagram of a conventional operation circuit based on the floating-point representation system.

FIG. 1 illustrates an example, of conventional floating-point operation circuits, which carries out an operation for two input numbers A and B each having a value of 2 as the radix (input operands A and B). When the mantissa part of the input operand A is Am, the exponent part thereof is Ae, the mantissa part of the input operand B is Bm, and the exponent part thereof is Be, the input operands A and B can be mathematically described as follows:

$$A = Am \cdot 2^{Ae} \quad (2)$$
$$B = Bm \cdot 2^{Be} \quad (3)$$

It is necessary to separately subject the mantissa and exponent parts of each of the input operands A and B to an arithmetic and logic operation. When the input operands A and B are supplied to the illustrated operation circuit, the exponent parts Ae and Be of the input operands A and B are supplied to an exponent part comparator 1. The mantissa parts Am and Bm of the input operands A and B are supplied to each of the selectors 2 and 3. The exponent part comparator 1 compares Ae and Be. Responsive to the comparison result, the selector 3 selects the mantissa part having a smaller value, which is then supplied to a shifter 4. The shifter 4 shifts the supplied mantissa part so that the values of both the exponent parts become identical to each other. The input operand having the other, larger value mantissa part is selected by the selector 2 and is supplied to an ALU 5 as it is. The ALU 5 subjects the input operand supplied from the selector 2 and the shifted input operand supplied from the shifter 4 to an arithmetic and logic operation.

In the case where the operation result is negative (in most cases, subtraction), the output of the ALU 5 is represented in the form of the two's complement. From this viewpoint, a two's complementer 6 is provided in order to convert the two's complement representation into the general representation (the IEEE 754-1985 standard format: IEEE is an abbreviation for Institute of Electrical and Electronics Engineers). When necessary, the two's complementer 6 is followed by a circuit for normalization and rounding.

The binary floating-point standards, which are widely used at present, are proposed by the IEEE, DEC, IBM and MIL-Std-1750A. Each of the standards represents a single-precision floating-point data with a word length of 32 bits. Additionally, each standard supports double-precision floating-point data. Some of the standards support other data formats, such as single precision in the extended format and double precision in the extended format.

A working group of the IEEE proposed the specification indicated in "ANSI/IEEE Std 754 - 1985", as a powerful standard for use in extremely flexible floating-point software. This proposal is widely supported, and likely will become the base of most hardware which will be produced from now and on.

However, the operation circuit of FIG. 1 has the aforementioned disadvantages arising from the arrangement whereby all the input operands pass through the exponent part comparator 1, the shifter 4, the ALU 5 and the complementer 6 without exception. This causes a delay in data processing. That is, some operands are not required to pass through all the parts of the operation circuit. The most critical path which causes the greatest amount of delay, is the path consisting of the exponent part comparator 1, the shifter 4, the ALU 5 and the complement 6. Generally, the shifter 4 and the complementer 6 cause a delay of about the same amount as that occurring in the ALU 5.

Figure 2A:
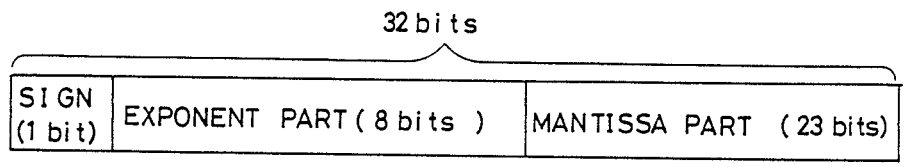
FIGS. 2A and 2B are views illustrating the IEEE 754-1985 standard floating-point representation formats.
Figure 2B:
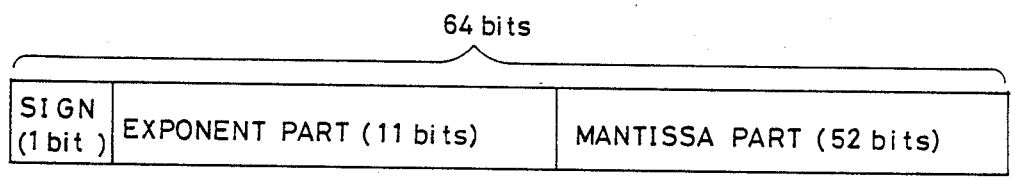

Before giving a description of a preferred embodiment of the present invention, the IEEE standard floating-point representation format is explained below. FIG. 2A shows the single-precision representation defined in the IEEE standard. As shown in FIG. 2A, the single-precision floating-point format consists of the sign (one bit), the exponent part (8 bits), and the mantissa part (23 bits). The total bit count of the single-precision floating-point format consists of 32 bits. As shown in FIG. 2B, the double-precision floating-point format consists of 64 bits, which consist of the sign (one bit), the exponent part (11 bits), and the mantissa part (52 bits). The mantissa part of each format is represented as 1.xxxxxxx (x is an arbitrary number, and the number "1" is a hidden bit). The exponent part is a biased exponent and always assumes positive values.

The general procedure of the floating-point operation is described with reference to FIG. 1. At the first step of the procedure, the exponent part Ae of the input operand A and the exponent part Be of the input operand B are compared with each other in the exponent part comparator 1, and the number of shifts, as is necessary to have the values of the exponent parts coincide with each other, is determined. At the second step, the shifting is carried out by the shifter 4. It is now assumed the input operands A and B are as follows:

A: mantissa part Am : 1.1xxxxxxxxx, exponent part Ae: 0011

B: mantissa part Bm : 1.1xxxxxxxxx, exponent part Be: 0001

In this case, the input operand B is subjected to shifting as follows:

A:  1.1xxxxxxxxx  exp 11
B: +) 0.011xxxxxxxxx exp 11

At the third step, an arithmetic and logic operation is carried out in the ALU 5.

For addition, the input operand A and the shifted input operand B are simply added. When the mantissa part of the shifted input operand B is denoted as Bms, the mantissa part Cm of the addition result is as follows:

$$Cm = Am + Bms \quad (4)$$

Subtraction (including addition of negative numbers) is as follows:

$$Am - Bm \rightarrow Am + (2 - Bms) = Am + (\overline{Bms} + LSB\text{'}1\text{'}) \quad (5)$$
$$2 + (Am - Bms) = Am + \overline{Bms} + LSB\text{'}1\text{'} = Dm \quad (6)$$

For $(Am - Bm) \leq 0$, $$Cm = Dm - 2 \quad (7)$$

In equation (6), LSB is the least significant bit.

The fourth step is the two's complement operation by the complementer 6. In the case where the result of subtraction is negative, this result is output as a two's complement. Therefore, in order to fit the result into the IEEE standard format, the two's complement operation is carried out.

For $$Am < Bm,$$
$$Bms - Am = Cm \quad (8)$$

From equation (6)

$$2 - Cm = 2 - (Bms - Am) = Dm \quad (9)$$

$$Cm = 2 - Dm = \overline{Dm} + LSB\text{'}1\text{'} \quad (10)$$

The present invention includes an improvement particularly on subtraction. The present invention is summarized as follows. When values of the exponent parts of two input operands are different from each other, the mantissa part presenting a smaller absolute value is supplied to the shifter, and the shifted mantissa part of the input operand is supplied to the ALU together with the other mantissa part which is provided with no delay. The output of the ALU is always positive, and is therefore allowed to bypass the complementer. On the other hand, when values of the exponent parts of the two input operands are identical to each other, both of the mantissa parts bypass the shifter, and are supplied to the ALU. The output of the ALU is always supplied to the complementer. It can be seen from the above-mentioned description that one of the shifter and the complementer 15 can be bypassed. As a result, the entire delay time is extremely decreased.

Figure 3:
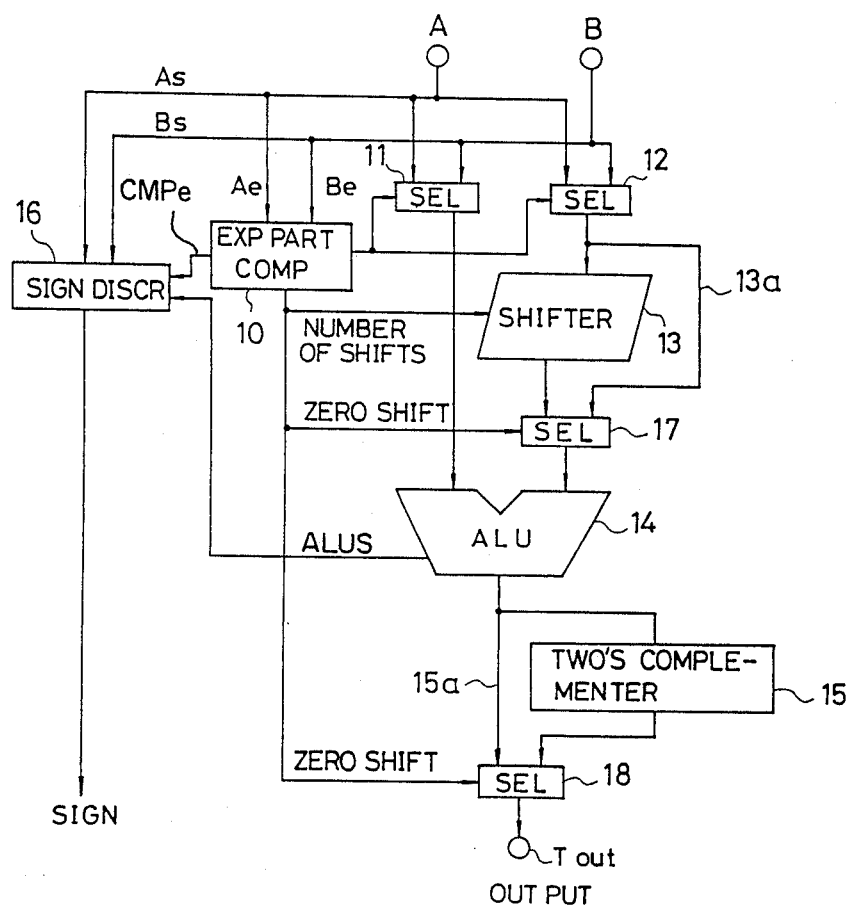
FIG. 3 is a block diagram of a preferred embodiment of the present invention.
Figure 4:
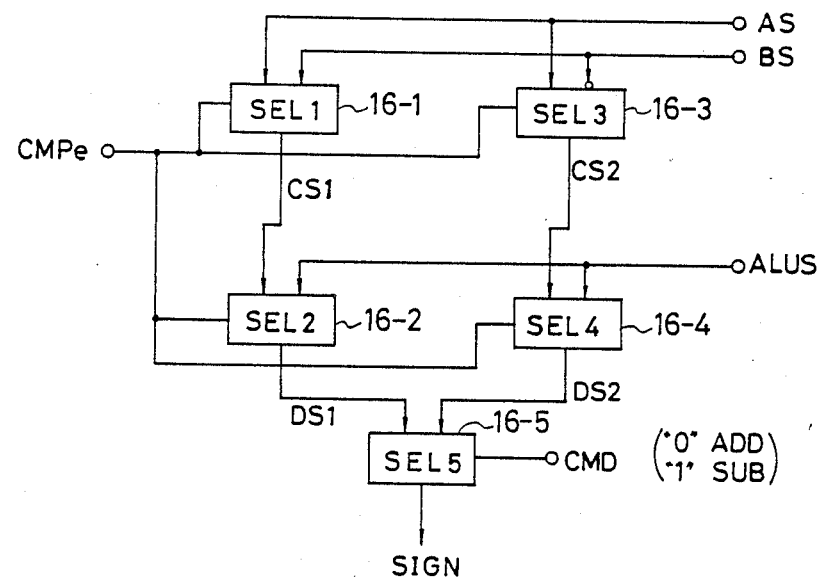
FIG. 4 is a block diagram of a sign discriminator used in the structure of FIG. 3

A description is given of a preferred embodiment of the present invention with reference to FIGS. 3 and 4.

FIG. 3 is a block diagram of the preferred embodiment of the present invention. Referring to FIG. 3, the operation circuit of the embodiment includes an exponent part comparator 10, selectors 11, 12, a shifter 13, an ALU 14, and a two's complementer, which have functions similar to those of the corresponding parts shown in FIG. 1.

In the embodiment, there are newly provided bypass lines 13a, 15a, a sign discriminator 16, and selectors 17, 18. The sign discriminator 16 is supplied with the signs As and Bs of the input operands A and B, respectively the comparison result produced and output by the exponent part comparator 10 and the sign of the output of the ALU 14 ("ALUS" in FIG. 3). The sign discriminator 16 makes a decision on the sign of the final operation result, which decision is output, on the basis of the result of the comparison in magnitude supplied from the exponent part comparator 10 and the sign of the operation result with respect to the mantissa supplied from the ALU 14. A further description will be given of the sign discriminator 16. The sign discriminator 16 implements together with the exponent part comparator 10, a comparison circuit which compares the values of both the exponent parts, and determines the number of shifts (including a zero shift) to be performed with respect to one of the mantissa parts by using the comparison result.

The input operands A and B are applied to both of the selectors 11 and 12. The selector 12 is controlled by the exponent part comparator 10 so as to always select that one of the two input operands A and B which has a smaller exponent part value. The selector 11 is controlled by the exponent part comparator 10 so as to always select that one of the two input operands A and B which has a larger exponent part value.

The selector 17 is interposed between the shifter 13 and the ALU 14, and is supplied with the mantissa part selected and output by the selector 12 through the bypass line 13a, and the mantissa part as output by the shifter 13. Based on the number of shifts indicated in the comparison output of the exponent part comparator 10, the selector 17 selects one of the two input signals supplied thereto and supplies the selected signal to the ALU 14. More specifically, when the number of shifts is equal to zero, the selector 17 selects the bypass line 13a, and thus selects the output of the selector 12 and supplies same directly supplied to the ALU 14. On the other hand, when the number of shifts is not equal to zero, the selector 17 selects the output of the shifter 13. Thus, the bypass line 13a is provided with respect to the shifter 13.

The selector 18 selects one of either the operation result produced and output by the ALU 14 through the bypass line 15a or the output signal of the two's complementer 15, which are applied to respective inputs of the selector 18, and the output of which is connected to the output terminal Tout. The selector 18 is controlled by the number of shifts, as determined and output by the exponent part comparator 10. When the number of shifts is equal to zero, the selector 18 selects the output signal of the two's complementer 15. When the number of shifts is a value other than zero, the selector selects the operation result as produced and output by the ALU 14. Thus, the bypass line 15a is provided with respect to the two's complementer 15.

A description now is given of an example of the structure of the sign discriminator 16 with reference to FIG. 4. Referring to FIG. 4, the sign discriminator 16 is made up of five selectors (SEL1 to SEL5) 16-1, 16-2, 16-3, 16-4 and 6-5. Each of the selectors 16-1 and 16-3 are provided with both the sign data As and the sign data Bs of the input operand A and the input operand B, respectively. The selectors 16-1 and 16-3 are controlled by the comparison result CMPe supplied from the exponent part comparator 10. The comparison result CMPe is represented by a two-bit code as shown in Table 1.

TABLE 1

| CMPe | Comparison Result |
|---|---|
| 00 | Ae = Be |
| 01 | Ae > Be |
| 10 | Ae < Be |

The selector 16-1 selects one of the two sign data As and Bs, depending on the values of the comparison result CMPe as shown in Table 2, where CS1 denotes the selected sign data.

TABLE 2

| (SEL1) | |
|---|---|
| CMPe | CS1 |
| 00 | '0' |
| 01 | As |
| 10 | Bs |

The selector 16-3 selects one of the two sign data As and Bs, depending on the values of the comparison result CMPe as shown in Table 3, where CS2 denotes the selected sign data.

TABLE 3

| (SEL3) | |
|---|---|
| CMPe | CS2 |
| 00 | '0' |
| 01 | As |
| 10 | Bs |

The selected signal CS1 is supplied to the selector 16-2, and the selected signal CS2 is supplied to the selector 16-4. The selectors 16-2 and 16-4 are supplied with the comparison result CMPe, and also the sign data ALUS output by the ALU 14.

The selector 16-2 selects one of the two input signals, depending on the values of the comparison result CMPe as shown in Table 4, where DS1 denotes the selected sign data.

TABLE 4

| (SEL2) | |
|---|---|
| CMPe | DS1 |
| 00 | ALUS |

TABLE 4-continued

| (SEL2) | |
|---|---|
| CMPe | DS1 |
| 01 | CS1 |
| 10 | CS1 |

The selector 16-4 selects one of the two input signals, depending the values of the comparison result CMPe as shown in Table 5, where DS2 denotes the selected sign data.

TABLE 5

| (SEL4) | |
|---|---|
| CMPe | DS2 |
| 00 | ALUS |
| 01 | CS2 |
| 10 | CS2 |

The selector 16-5 is supplied with the signals DS1 and DS2, and selects one of them in response to the value of a command code CMD used to designate the type of operation which should be performed by the ALU 14. When command code CMD is '0', addition is selected, and the other hand, when the command code CMD is "1", subtraction is selected.

Table 6 shows the relationship between the values of the command code CMD and the selected signals depending thereon.

TABLE 6

| (SEL5) | |
|---|---|
| CMD | Sign |
| 0 | DS1 |
| 1 | DS2 |

A description is given of the operation of the embodiment. Generally, in operations based on the floating-point representation system, the two's complement operation is required only for the case where the output of the ALU 14 is negative. This is limited to subtraction (including addition of negative numbers). Therefore, the operation of the embodiment is mainly described for subtraction.

When the values of the exponent parts of the input operands A and B are different from each other (Ae=Be), the relationship in magnitude between values of the exponent parts is discriminated by the exponent part comparator 10. Then the exponent part comparator 10 supplies to the shifter 13, a number of shifts which is dependent on the difference in magnitude between the values of the exponent parts, and supplies the comparison result CMPe to the selectors 11 and 12. Responsive to the comparison result CMPe, the selector 12 selects the mantissa part of the input operand having the smaller exponent part value (input operand B in the above-mentioned example). The selected mantissa part is supplied to the shifter 13 also and to the selector 17, the latter through the bypass line 13a. The shifter 13 shifts the selected mantissa part by the number of shifts, as a instructed by the exponent part comparator 10, and outputs the shifted mantissa part to the selector 17. For Ae≠Be, the selector 17 selects the output supplied from the shifter 13. Then, subtraction is carried out by ALU 14, between the output of the selector 17 and the output of the selector 11. The result of subtraction is always positive. Therefore, the subtraction result from ALU 14 is directly output through the selector 18.

In this manner, subtraction is carried out in such a way that the one input operand having the smaller absolute value of the exponent part is subtracted from the other input operand having the larger absolute value of the exponent part. Thereby, it becomes possible to always obtain the positive subtraction result, which does not require the two's complementer 15. This results in a reduction of processing time. It is noted that since the selectors 17 and 18 are simple switches, the operation of the selectors 17 and 18 is much faster than that of the shifter 13 and the two's complementer 15. The sign of the operation result available at the output terminal Tout is supplied from the sign discriminator 16. In the present case, the sign of the input operand B is selected by the selector 16-3, and the sign CS2 is selected by the selector 16-4. The command code is '1' (subtraction), and therefore, the sign DS2 is selected by the selector 16-5. In this case, the sign DS2 is the inverted sign of the input operand B.

In the case where Ae=Be, the relationship in magnitude between the input operands A and B cannot be discriminated until the mantissa parts of the input operands are investigated. Further, there is a probability that the subtraction result may be negative. If the subtraction result is negative, the output of the ALU 14 must be subjected to the two's complement operation by the two's complementer 15. This causes a delay. On the other hand, since the values of the exponent parts are identical to each other, it is not necessary to shift the mantissa part by the shifter 13. That is, the shifting process is not required. As a result, it becomes possible to speed up the process.

When the values of the exponent parts are identical, an instruction that the number of shifts is zero is supplied to the selector 17 and 18. Then the selector 17 selects the output supplied through the bypass line 13a. Then the subtraction operation is performed on the outputs of the selectors 11 and 17 by the ALU 14. The output of the ALU 14 may be negative. The sign of the output of the ALU 14 ('ALUS' in FIG. 3) is supplied to the sign discriminator 16. The selector 18 always selects the output of the two's complementer 15 irrespective of the sign of the output of the ALU 14("ALUS"). Then, the output of the two's complementer 15 is selected by the selector 18, and is output through the output terminal Tout.

When Ae=Be, the comparison result CMPe is 00. Therefore, the signals CS1 and CS2 (FIG. 3) are zero. Further, the selectors 16-2 and 16-4 select the sign ALUS of the output of the ALU 14. Then, the sign ALUS is selected by the selector 16-5, and supplied to the following stage.

Since the output of the ALU 14 does not pass through the two's complement 15, a delay resulting therefrom is eliminated.

According to the present invention, one or the either of the shifter 13 and the two's complement 15 is omitted in operation, without exception. Although the amount of delay depends on the circuit configuration, it may be said that an approximately 20–30 % reduction of the entire delay presented in the conventional circuit configuration is obtainable through the present invention. Additionally, the present invention can be constructed by a slight addition of hardware. Therefore, the invention is very effective in practical use.

The output terminal Tout may be followed by a circuit for performing normalization and further rounding. When the input operand A or B is a non-normalized number, as defined by the IEEE, in which all the numerics of the exponent part are zero, the input operands A and B can be processed as in the case where A=B.

The present invention is not limited to the specifically disclosed embodiments, and variations and modifications may be made without departing from the scope of the present invention.

What is claimed is:

1. An operation circuit for processing two input operands, each represented in the floating-point representation system with a sign, an exponent part and a mantissa part, comprising:

comparing means for comparing the values of the exponent parts of said two input operands with each other and thereby determining the number of shifts required with respect to the mantissa part of one of said two input numbers thereby to make the respective exponent part values of the two input operands coincide and producing a comparison result output indicating the number of shifts and correspondingly the relationship in magnitude of the values of the exponent parts of said two input operands;

selecting means for selectively outputting the mantissa parts of said two input operands, based on said comparison result output of said comparing means;

shifter and bypass means for receiving as an input thereto and shifting, by the number of shifts indicated by the comparison result output of said comparing means, the mantissa part of an operand having a smaller exponent part value as selectively output by said selecting means and producing the shifted mantissa part as an output when the values of the exponent parts of said two input operands are different from each other, and for receiving and directly outputting, thereby bypassing the shifting means, outputting one of the mantissa parts of said two input operands as selectively output by said selecting means when the values of the exponent parts of said two input operands are identical to each other;

operation means for performing a predetermined operation on the mantissa part output of said shifter and bypass means and the mantissa part of the other operand as selectively output by said selecting means, thereby producing an operation result as the output of said operation means;

an output terminal;

a bypass line and a two's complementer, each receiving the operation result output of said operation means, said two's complementer producing as an output the two's complement of the operation result and said bypass line directly outputting the operation result; and a final output result selector having first and second inputs respectively connected to the output of said two's complementer and to said second bypass line and an output connected to said output terminal, said f.o.r. selector being controlled by the comparison result output of said comparing means and, in response thereto, selectively supplying the two's complement operation result output of the two's complementer to the output terminal as the final operation result output when the values of the exponent parts of the two input operands are identical, and selectively supplying said operation result as directly output by said second bypass line to said output terminal as the final operation result output when the values of the respective exponent parts of the two input operands are different from each other.

2. An operation circuit as claimed in claim 1, wherein said comparing means comprises sign discriminator means for determining the sign of said final operation result, when selectively supplied from the output of said two's complementer, on the basis of the respective signs of said two input operands, said comparison result output, the sign of said operation result output of said operation means, and the type of said predetermined operation performed by said operation means.

3. An operation circuit as claimed in claim 2, wherein said sign discriminator means comprises first through fifth selectors each having first and second inputs and an output, said first to fourth selectors being controlled by said comparison result output, and said fifth selector being controlled in accordance with the type of said predetermined operation, said first and second inputs of said first and third selectors being supplied respectively with the signs of said two input operands, the outputs of said first and third selectors being connected to said first inputs of said second and fourth selectors, respectively, and said second inputs thereof being supplied with the sign of said operation result, and said first and second inputs of said fifth selector being connected to the outputs of said second and fourth selectors, respectively, and the sign of said final operation result being output through the output of said fifth selector.

4. An operation circuit as claimed in claim 1, wherein said shifter and bypass means comprises a shifter, an associated selector, and an associated bypass line, said associated selector having first and second inputs and an output, said first and second inputs being connected to said shifter and said associated bypass line, respectively, and the output of said associated selector being connected to said operation means, said associated selector being controlled by said comparison result output.

5. An operation circuit as claimed in claim 4, wherein said associated selector selects said associated bypass line when the number of shifts indicated by said comparison result output is zero.

6. An operation circuit as claimed in claim 1, wherein said f.o.r. selector selects said two's complementer when the number of shifts indicated by said comparison result output is zero.

7. An operation circuit as claimed in claim 1, wherein said selecting means comprises first and second initial selectors, each having first and second inputs and an output, said first and second inputs of both of the first and second initial selectors being supplied with said respective first and second input operands, and the output of said first initial selector being connected to said operation means, and the output of said second initial selector being connected in common to the inputs of said shifter and bypass means.

8. An operation circuit as claimed in claim 7, wherein said second, initial selector is controlled by the comparison result output of said comparing means so as to always select the mantissa part of the operand having the smaller exponent part value.

9. An operation circuit as claimed in claim 1, wherein said predetermined operation is subtraction.

* * * * *

UNITED STATES PATENT AND TRADEMARK OFFICE
CERTIFICATE OF CORRECTION

PATENT NO. : 4,977,534

DATED : Dec. 11, 1990

INVENTOR(S) : TAKAHASHI

It is certified that error appears in the above-identified patent and that said Letters Patent is hereby corrected as shown below:

Col. 1, line 26, equation (1), change "-1)" to --(-1)--;
    line 55, after "about" insert --the--.

Col. 3, line 30, change "When" to --Where--;
    line 47, change "from now and on" to --presently and in the future--.

Col. 4, line 42 (Equation (6)), change "LSB'1'" to --LSB'1"--;
    line 43, change "$\leq$" to --$\geq$--.

Col. 5, line 37, after "implements" insert --,--.

Col. 6, line 17, change "6-5" to --16-5--.

Col. 7, line 25, after "and" insert --on--;
    line 58, change "also and" to --and also--;
    line 61, delete "a".

UNITED STATES PATENT AND TRADEMARK OFFICE
CERTIFICATE OF CORRECTION

PATENT NO. : 4,977,534
DATED : Dec. 11, 1990
INVENTOR(S) : TAKAHASHI

It is certified that error appears in the above-identified patent and that said Letters Patent is hereby corrected as shown below:

Col. 8, line 35, change "selector" to --selectors--;
line 50, delete "ALUS", after "14" insert --("ALUS")--, and delete "the sign";
line 54, change "complement" to --complementer--;
line 56, change "either" to --other--;
line 57, change "complement" to --complementer--.

Signed and Sealed this

Eighteenth Day of August, 1992

*Attest:*

DOUGLAS B. COMER

*Attesting Officer*     *Acting Commissioner of Patents and Trademarks*